(12) United States Patent
Holden

(10) Patent No.: US 6,532,992 B1
(45) Date of Patent: Mar. 18, 2003

(54) REUSABLE PIPE FLANGE COVER

(75) Inventor: James Elliott Holden, Simpsonville, SC (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/603,407

(22) Filed: Jun. 26, 2000

(51) Int. Cl.[7] .................................................. F16L 59/06
(52) U.S. Cl. ......................... 138/96 R; 138/89; 220/324
(58) Field of Search .............................. 138/96 R, 89, 138/109; 220/324

(56) References Cited

U.S. PATENT DOCUMENTS

| | | | | |
|---|---|---|---|---|
| 3,856,050 A | * | 12/1974 | Rooney | ..................... 138/96 R |
| 3,942,681 A | * | 3/1976 | Richardson | ........... 138/96 R X |
| 3,991,446 A | * | 11/1976 | Mooney et al. | ......... 138/108 X |
| 4,014,368 A | * | 3/1977 | Nelsen | ................... 138/96 R X |
| 4,423,753 A | * | 1/1984 | Smith et al. | .......... 138/96 R X |
| 4,915,137 A | * | 4/1990 | Hall et al. | ................. 138/96 R |
| 5,048,571 A | * | 9/1991 | Ellis | ....................... 138/110 X |
| 5,265,752 A | * | 11/1993 | Olson | ................... 138/96 R X |

* cited by examiner

*Primary Examiner*—Patrick Brinson
(74) *Attorney, Agent, or Firm*—Nixon & Vanderhye

(57) ABSTRACT

A pipe flange cover for temporarily covering a pipe opening and a pipe flange at an end of a pipe, the cover having a front face and a rear face, the rear face having a center portion surrounded by a peripheral portion of the rear face, the peripheral portion formed with a plurality of axially projecting spring lugs; the center portion adapted to engage a front side of the pipe flange and to seal the pipe opening, the spring lugs adapted for insertion into bolt holes on the pipe flange. The center portion is axially offset from the peripheral portion, and connected thereto by an integral bellows.

12 Claims, 2 Drawing Sheets

REUSABLE PIPE FLANGE COVER

BACKGROUND OF THE INVENTION

This invention relates generally to power plant construction and, specifically, to a unique and reusable pipe flange cover that protects pipe flanges from damage and prevents debris from entering the pipe opening surrounded by the flange, primarily during storage and shipment and prior to installation in the plant.

Construction of a power plant involves the manufacture and assembly of many and various styles and sizes of flanged pipe assemblies. A major requirement in the manufacture and assembly of these flanged pipe assemblies is that they are clean and free of foreign debris between the time they are manufactured and the time they are installed. Existing flange cover designs fall into two categories:

a. Metal flange covers with rubber gaskets held in place by the use of nuts and bolts. These covers protect the flange face, seal the pipe opening, and make use of the bolt holes in the flange to secure the cover in place. This configuration, however, requires tools to install and involves a cumbersome procedure. Due to the weight of the flange and the requirement to use nuts and bolts to secure the cover to the flange, it is often either not properly installed, or not properly re-installed when taken off for any reason. An example of this type cover is shown in FIGS. 1 and 2 and described further herein.

b. Plastic covers of various configurations. The plastic covers do an adequate job of protecting the flange face but do not adequately seal the pipe opening. The plastic tends to warp when exposed to sunlight or extreme temperature variations. The majority of this type of flange cover do not have positive retention methods, and therefore they tend to come off during use. An example of a plastic cover is shown in FIGS. 3 and 4 and also described further herein.

BRIEF SUMMARY OF THE INVENTION

This invention relates to a molded plastic cover that completely covers the pipe opening and pipe flange face and, is secured to the flange by pushing resilient or spring-type lugs that protrude from the rear of the cover into the bolt holes in the flange. The flange cover includes a bellows-type arrangement that accommodates both flat face flanges and raised face flanges. The bellows also compensates for variations in flange thickness and acts to seal debris from the interior of the pipe.

No tooling is required for installation or removal of the cover, but it is held securely in place by the spring lugs, and the cover is also designed to be reusable.

Thus, in its broader aspects, the invention relates to a pipe flange cover for temporarily covering a pipe opening and a pipe flange at an end of a pipe, the cover having a front face and a rear face, the rear face having a center portion and a peripheral portion, the peripheral portion formed with a plurality of axially projecting spring lugs; the center portion adapted to engage a front side of the pipe flange and to seal the pipe opening, the spring lugs adapted for insertion into bolt holes on the pipe flange; and wherein the center portion is axially offset from the peripheral portion.

In another aspect, the invention relates to a pipe flange cover for temporarily covering a pipe opening and a pipe flange at an end of a pipe, the cover having a front face and a rear face, the rear face having a center portion and a peripheral portion, the peripheral portion formed with a plurality of axially projecting spring lugs; the center portion adapted to engage a front side of the pipe flange and to seal the pipe opening, the spring lugs adapted for insertion into bolt holes on the pipe flange; and wherein the center portion is axially offset from the peripheral portion but connected thereto by an integral bellows.

DETAILED DESCRIPTION OF THE INVENTION

Figure 1:
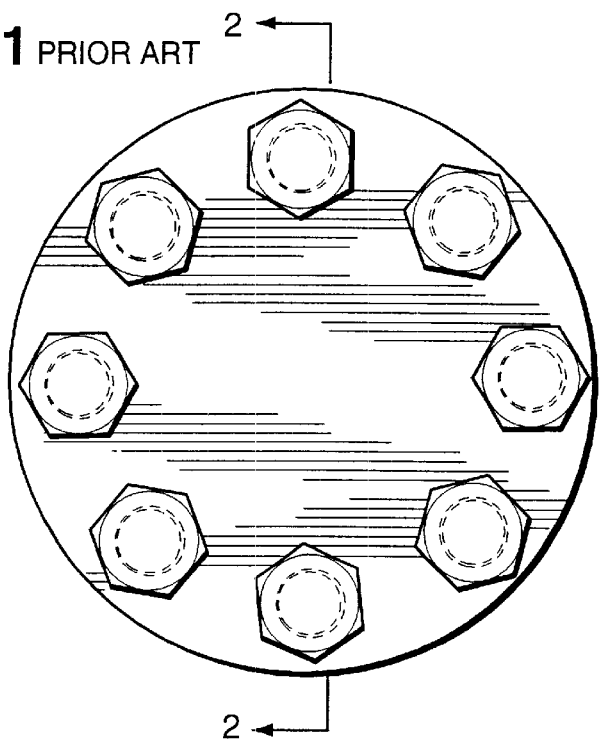
FIG. 1 is a plan view of a known pipe flange cover.
Figure 2:
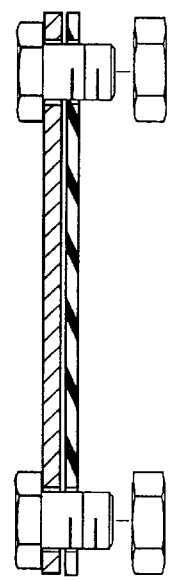
FIG. 2 is a side section of the cover shown in FIG. 1.

FIGS. 1 and 2 illustrates a known pipe flange cover 10 that includes a round plate 12 and an underlying, similarly sized rubber gasket 14. Both components 12 and 14 have a plurality of alignable bolt holes 16, 18, respectively, formed therein for accommodating a plurality of nuts and bolts 20, 22, respectively, that are used to secure the cover 10 the pipe flange (not shown). The bolts 22 pass through holes 16 and 18 as well as the bolt holes in the pipe flange, and are secured with the nuts 20 that are tightened from the underside of the flange.

Figure 3:
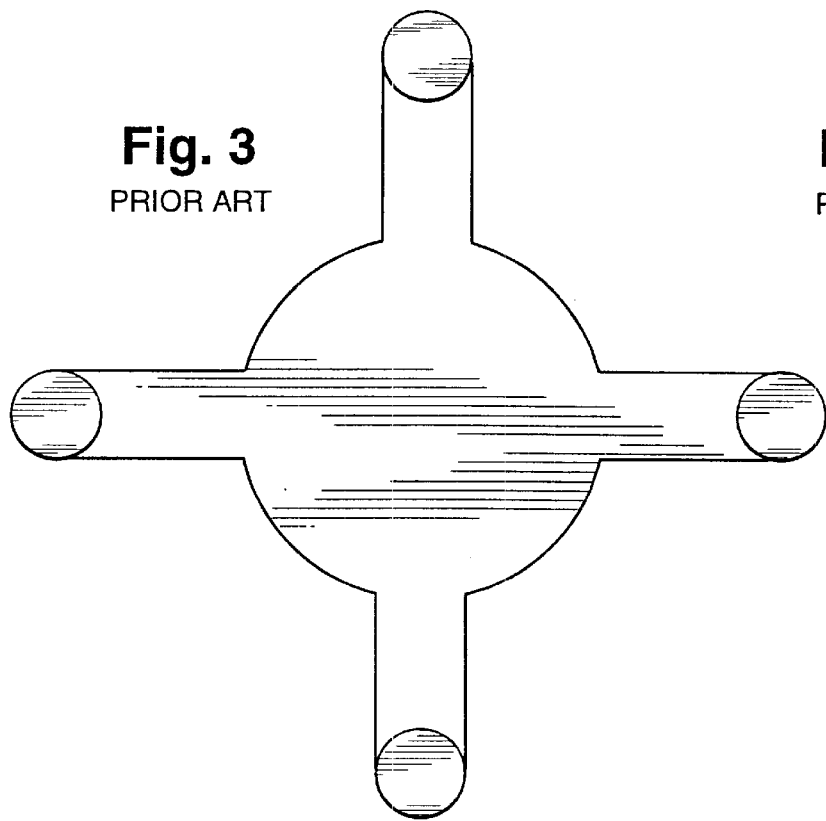
FIG. 3 is a plan view of another known pipe flange cover.
Figure 4:
FIG. 4 is a side elevation of FIG. 3.

FIGS. 3 and 4 illustrate another known pipe flange cover that includes a center panel 24 adapted to seal a pipe opening, and a plurality of radial spokes 26, each having a smooth cylindrical "plug" 28 at the radially outermost end thereof. The plugs 28 are adapted to seat in the pipe flange bolt holes, holding the cover panel 24 against the pipes flange assembly by friction.

Figure 7:
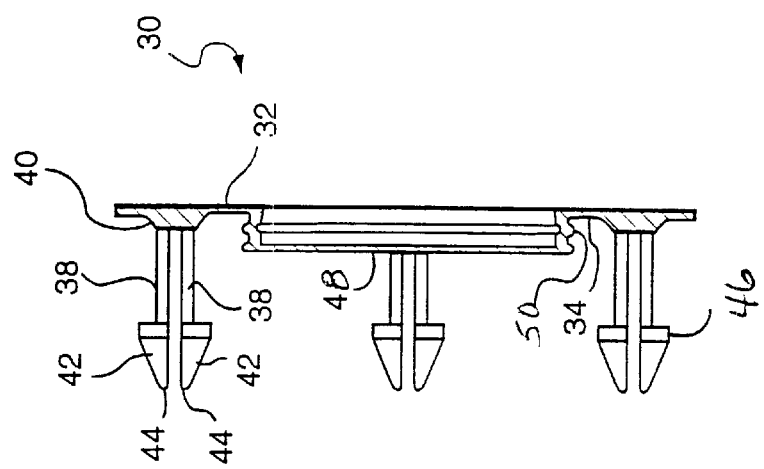
FIG. 7 is side section taken along the line 7—7 in FIG. 6.
Figure 6:
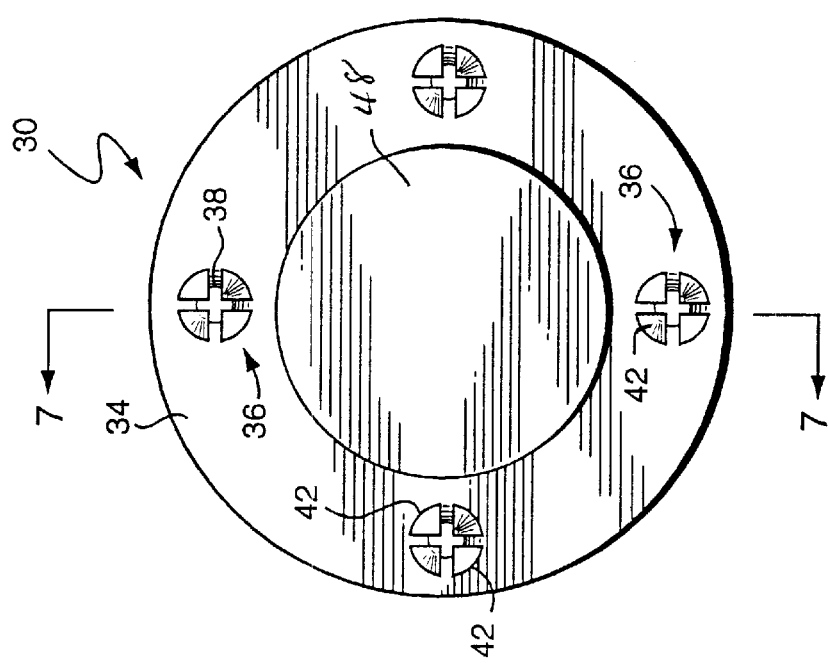
FIG. 6 is a bottom plan view of the cover shown in FIG. 5.
Figure 5:
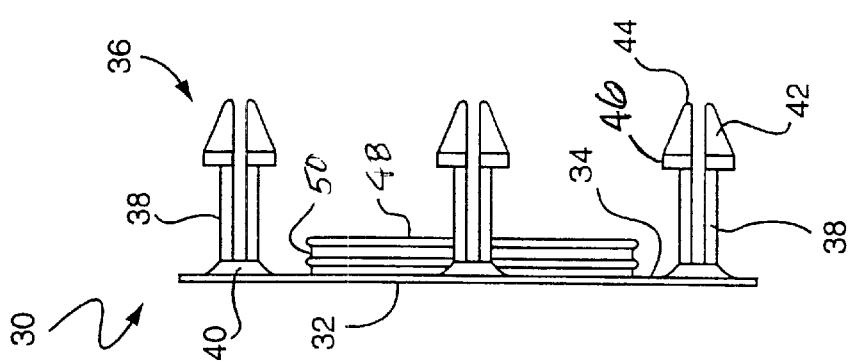
FIG. 5 is a side elevation of the cover in accordance with the invention.

Turning now to FIGS. 5–7, a round pipe flange cover 30 in accordance with this invention includes a round front face 32 and rear face 34. The rear face 34 includes a plurality of spring lugs 36, four at 90° intervals in the illustrated and preferred embodiment, arranged about a peripheral portion of the cover. Since the spring lugs 36 are identical, only one need be described on detail. Each spring lug 36 consists of four stems 38 extending axially from a boss 40 on the rear face 34. The stems 38 together form a generally cylindrical lug body of relatively small diameter. The free ends of the stems are provided with enlarged heads 42, that taper axially to a forward, rounded point 44. Each head 42 effectively provides a 90°, tapered segment so that the four heads 42 combine to form a generally cone-shaped end. The heads are sized to allow insertion into a respective bolt hole on the pipe flanges, it being understood that the diameter at the rearward edges 46 of the heads 42 is larger than the diameter of the bolt hole. However, because of the flexible nature of the plastic material, and the spaces between each of the heads 42 (and stems 38), the heads 42 may be compressed radially, permitting insertion into the bolt hole, with the heads springing back to their normal uncompressed diameter (or to a still compressed diameter that is nevertheless larger than the bolt hole) on the back side of the bolt hole. Thus, the cover 30 can be held securely in place by the mechanical spring-loaded connection between the spring lugs 36 and the pipe flange.

Another feature of the invention is the inclusion of a bellows-type disk 48 that is provided in the center portion of the rear face 34 of the cover, and that effectively seals the pipe opening, more specifically, the disk 48 forms a sealing face that is offset from rear face 34 toward the pipe opening, and moveable relative to the rear face 34 of the cover by reason of an integral bellows 50 between the disk and the rear face 34, the bellows allowing the disk to move axially as well as to flex slightly in any direction to thereby compensate for thickness variations in the pipe flange. In addition, the offset disk 48 allows the cover to be used with flat face pipe flanges as well as raised-face pipe flanges.

The advantages of a pipe flange cover as described above are that the cover is reusable; it has a minimum number of parts; it has a positive mechanical retention feature; it protects the pipe flange and seals pipe opening; and it is easy to use.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A pipe flange cover for temporarily covering a pipe opening and a pipe flange at an end of a pipe, the cover having a front face and a rear face, said rear face having a center portion surrounded by a peripheral portion of the rear face, said center portion offset from said rear face in a direction toward the pipe opening, said peripheral portion formed with a plurality of axially projecting spring lugs; said center portion adapted to engage a front side of said pipe flange and to seal the pipe opening, said spring lugs adapted for insertion into bolt holes on the pipe flange; and wherein said center portion is axially offset from said peripheral portion.

2. The pipe flange cover of claim 1 wherein said spring lugs include enlarged, tapered heads.

3. The pipe flange cover of claim 2 wherein said spring lugs each comprise four discrete stems, each stem having one of said enlarged tapered heads at an end thereof remote from said rear face.

4. A pipe flange cover for temporarily covering a pipe opening and a pipe flange at an end of a pipe, the cover having a front face and a rear face, said rear face having a center portion surrounded by a peripheral portion of the rear face, said peripheral portion formed with a plurality of axially projecting spring lugs; said center portion adapted to engage a front side of said pipe flange and to seal the pipe opening, said spring lugs adapted for insertion into bolt holes on the pipe flange; wherein said spring lugs each comprise four discrete stems, each stem having an enlarged tapered head at an end thereof remote from said rear face; and further wherein said center portion is connected to said peripheral portion by an integral bellows.

5. The pipe flange cover of claim 3 wherein said enlarged tapered heads together form a cone with a rounded point at a forward end thereof.

6. The pipe flange of claim 5 wherein said cone has a relatively larger diameter at a rearward end thereof.

7. The pipe flange of claim 6 wherein said discrete stems together form a lug body of relatively small diameter.

8. A pipe flange cover for temporarily covering a pipe opening and a pipe flange at an end of a pipe, the cover having a front face and a rear face, said rear face having a center portion surrounded by a peripheral portion, said peripheral portion formed with a plurality of axially projecting spring lugs; said center portion adapted to engage a front side of said pipe flange and to seal the pipe opening, said spring lugs adapted for insertion into respective bolt holes on the pipe flange; and wherein said center portion is axially offset from said peripheral portion and connected thereto by an integral bellows.

9. The pipe flange cover of claim 1 wherein said spring lugs include enlarged, tapered heads.

10. The pipe flange cover of claim 2 wherein said spring lugs each comprise four discrete stems, each stem having one of said enlarged tapered heads at an end thereof remote from said rear face.

11. A pipe flange cover for temporarily covering a pipe opening and a pipe flange at an end of a pipe, the cover having a front face and a rear face, said rear face having a center portion surrounded by a peripheral portion of the rear face, said peripheral portion formed with a plurality of axially projecting spring lugs; said center portion adapted to engage a front side of said pipe flange and to seal the pipe opening, said spring lugs adapted for insertion into bolt holes on the pipe flange; and wherein said center portion is axially offset from said peripheral portion and connected to said peripheral portion by an integral bellows.

12. A pipe flange cover for temporarily covering a pipe opening and a pipe flange at an end of a pipe, the cover having a front face and a rear face, said rear face having a center portion surrounded by a peripheral portion, said peripheral portion formed with a plurality of axially projecting spring lugs; said center portion adapted to engage a front side of said pipe flange and to seal the pipe opening, said spring lugs adapted for insertion into respective bolt holes on the pipe flange; and wherein said center portion is axially offset from said peripheral portion and moveable relative to said rear face in any direction to thereby compensate for thickness variations in the pipe flange.

* * * * *